(12) United States Patent
Shakal et al.

(10) Patent No.: US 10,647,156 B2
(45) Date of Patent: May 12, 2020

(54) AXLE SHOCK-LOAD ABSORBER AND GUARD

(71) Applicant: KNINE Racing Ltd., Mayo (IE)

(72) Inventors: Benjamin Grant Shakal, Galway (IE); Wayne Adam Shakal, Osceola, WI (US); Jordan Sedivy, Chippewa Falls, WI (US)

(73) Assignee: KNINE Racing Ltd., Mayo (IE)

( * ) Notice: Subject to any disclaimer, the term of this patent is extended or adjusted under 35 U.S.C. 154(b) by 0 days.

(21) Appl. No.: 15/687,160

(22) Filed: Aug. 25, 2017

(65) Prior Publication Data

US 2018/0072097 A1      Mar. 15, 2018

Related U.S. Application Data

(63) Continuation of application No. 14/148,597, filed on Jan. 6, 2014, now abandoned.

(51) Int. Cl.
*B60B 35/14* (2006.01)
*B60B 35/12* (2006.01)

(52) U.S. Cl.
CPC .............. *B60B 35/14* (2013.01); *B60B 35/12* (2013.01); *B60B 2900/121* (2013.01); *B60B 2900/131* (2013.01); *B60B 2900/212* (2013.01); *Y02T 10/86* (2013.01)

(58) Field of Classification Search
CPC ......... B60B 35/00; B60B 35/12; B60B 35/14; B60B 35/16; B60B 35/163; B60B 35/166; B60B 2900/212; B60B 2310/305; B60B 2900/711; B60B 2900/731; Y10T 74/2188

USPC .............................. 301/130, 124.1, 129, 128
See application file for complete search history.

(56) References Cited

U.S. PATENT DOCUMENTS

| | | | |
|---|---|---|---|
| 639,178 A | 12/1899 | Maddox | |
| 2,634,169 A * | 4/1953 | Martin | B60B 35/04 29/455.1 |
| 4,486,052 A | 12/1984 | Taggart, Jr. | |
| 5,374,085 A | 12/1994 | Beatrice et al. | |
| 5,855,416 A * | 1/1999 | Tasker | B60B 35/166 188/18 A |
| 6,024,418 A * | 2/2000 | Ebert | B23K 31/02 29/402.13 |
| 6,241,062 B1 * | 6/2001 | Enright | F16F 7/00 188/18 A |
| 6,409,606 B1 | 6/2002 | Nakajima et al. | |
| 6,561,723 B2 | 5/2003 | McCurdy et al. | |
| 6,863,462 B1 * | 3/2005 | Snow | B60B 35/12 403/290 |
| 6,926,371 B1 | 8/2005 | Gagnon | |
| 7,108,336 B2 | 9/2006 | Dombroski | |

(Continued)

*Primary Examiner* — Brian L Swenson
(74) *Attorney, Agent, or Firm* — Fredrikson & Byron, P.A.

(57) ABSTRACT

A device for reducing axle failures on motorized vehicles that includes a sleeve that wraps around the axle and a separate single pieces or two-piece axle guard that wraps around said sleeve. The present invention allows the torsional flex that the axle manufacturer intended to occur but prohibits the axle from bending and possibly breaking. The present invention also acts as a shock-absorber for the axle by absorbing energy that is being transferred through the axle during normal use. Absorbing this energy increases the life of the axle and drive-train and reduces the risk of failure during use.

11 Claims, 5 Drawing Sheets

(56) References Cited

U.S. PATENT DOCUMENTS

| | | | |
|---|---|---|---|
| 7,214,135 B2 * | 5/2007 | Laskey | F16F 15/10 |
| | | | 464/180 |
| 7,731,301 B2 | 6/2010 | Pell et al. | |
| 8,863,390 B1 * | 10/2014 | Ley | F16C 3/02 |
| | | | 181/208 |
| 9,033,807 B1 * | 5/2015 | Ley | B21D 39/04 |
| | | | 29/428 |
| 9,452,639 B2 * | 9/2016 | Dziekonski | B60B 35/00 |
| 9,533,531 B2 * | 1/2017 | Dziekonski | B60B 35/04 |
| 2004/0256910 A1 * | 12/2004 | Chalin | B60B 35/04 |
| | | | 301/124.1 |
| 2006/0001312 A1 | 1/2006 | MacKarvich | |
| 2006/0276252 A1 * | 12/2006 | Tkacik | F16F 15/12 |
| | | | 464/180 |
| 2009/0197690 A1 * | 8/2009 | Lyscio | F16C 3/02 |
| | | | 464/180 |
| 2011/0219602 A1 | 9/2011 | Toepker | |

* cited by examiner

US 10,647,156 B2

AXLE SHOCK-LOAD ABSORBER AND GUARD

CROSS-REFERENCE TO RELATED APPLICATIONS

This application is a continuation of U.S. patent application Ser. No. 14/148,597, filed Jan. 6, 2014, the entire contents of which are incorporated herein by reference.

BACKGROUND OF THE INVENTION

During the use of motorized vehicles, such as all-terrain-vehicles (ATVs), utility-terrain-vehicles (UTVs), and other off-road type vehicles, it is known for there to be axle failures in the form of bending and/or breaking. This can render the vehicle inoperable and the operator stranded, potentially in remote, hard to reach areas. A common response to these bending or break failures is to replace the original manufacturers intended axle with a larger more rigid after-market axle. While this does reduce the chance of axle failure, because it is no longer the weakest link, failures can shift to other components in the drive-train assembly; for example, CV joints and the differential. This is often a more serious and costly failure and is a main reason that axles are normally designed to fail first. Furthermore, in the event that a break in the axle shaft does occur, it typically will leave the vehicle inoperable.

Axle shafts are designed to provide a certain amount of torsional flex. A common, known, approach is to decrease the axle shaft diameter to achieve the desired amount of torsional flex the axle will have for a given applied torque. The function that the torsional flex provides is multi-fold. It decreases the impact to other driveline components during high torque loads that frequently occur during use. It improves fatigue life by absorbing torsional forces and requiring less strain from the axle's material properties. The axle shaft acts as a 'release valve' and is typically designed to fail before other components in the drivetrain system. The benefit this serves is offset by an increased proneness to axle bending and breaking due to force shock loads that occur during use. The proposed device inhibits axle bending and absorbs energy, also referred to as shock-load, while allowing the intended torsional flex in the axle shaft to occur, decreasing the chance of failure and extending the life of the axle. Furthermore, in the event that the axle breaks with the proposed device attached, assuming other drive axles are still delivering power to the ground, the vehicle will remain operable.

Having researched and found no prior art, the inventors sought to invent a device to reduce the frequency of these failure occurrences while at the same time preserving the intended function of the original manufacturer's designed-in torsional flex capabilities of the axle.

BRIEF SUMMARY OF THE INVENTION

A device for reducing the occurrence of axle bending or breaking on any motorized, powered vehicle such as, but not limited to, all-terrain-vehicles (ATVs), utility-terrain-vehicles (UTVs), and off-road vehicles. In summarized form, when the proposed device is attached to an axle shaft it prevents the axle from bending and absorbs shock load that is being transferred through the axle during normal use, while allowing the original axle manufacturer's intended torsional flex in the axle shaft to occur, decreasing the chance of failure and extending the life of the axle. Furthermore, in the event that the axle breaks due to excessive torsional flex, with the proposed device attached, assuming other drive axles are still delivering power to the ground, the vehicle will remain operable.

DETAILED DESCRIPTION OF THE INVENTION

It will be apparent to those skilled in the art, that is, to those who have knowledge or experience in this area of technology, that many design variations are possible to achieve the stated use and benefits of the present invention. The following detailed discussion of various alternative and preferred embodiments illustrate the general principles of the invention with reference to several specific embodiments of the present invention.

Figure 1:
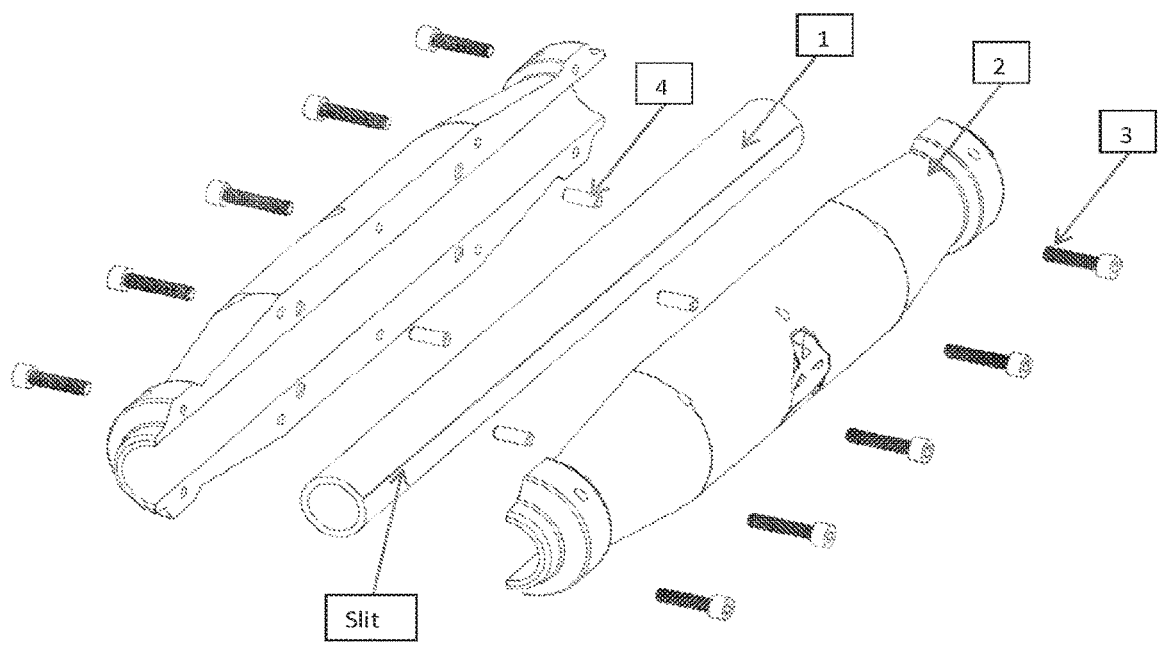
FIG. 1 is an isometric exploded assembly view of first embodiment of present invention.

Element 1 of FIG. 1 shows a sleeve slit down the length that snaps over an axle shaft.

Element 2 of FIG. 1 shows axle guard halves that are clamped around sleeve 1.

Element 3 of FIG. 1 shows socket head cap screws used to clamp axle guard halves 2 around sleeve 1.

Element 4 of FIG. 1 shows a dowel pin for aligning axle guard halves 2 together.

Figure 2:
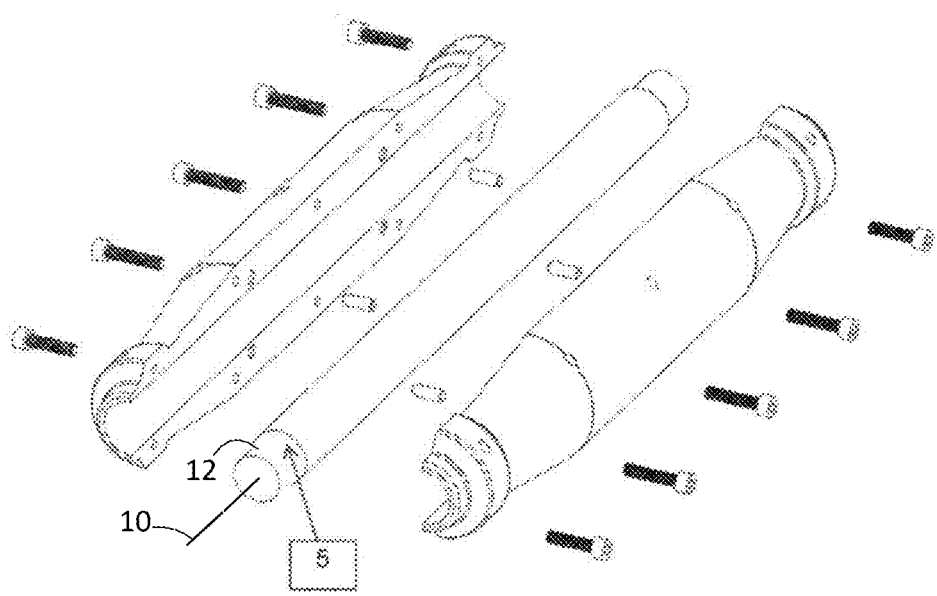
FIG. 2 is an isometric exploded assembly view of first embodiment of proposed invention showing sleeve around an axle shaft.
Figure 3:
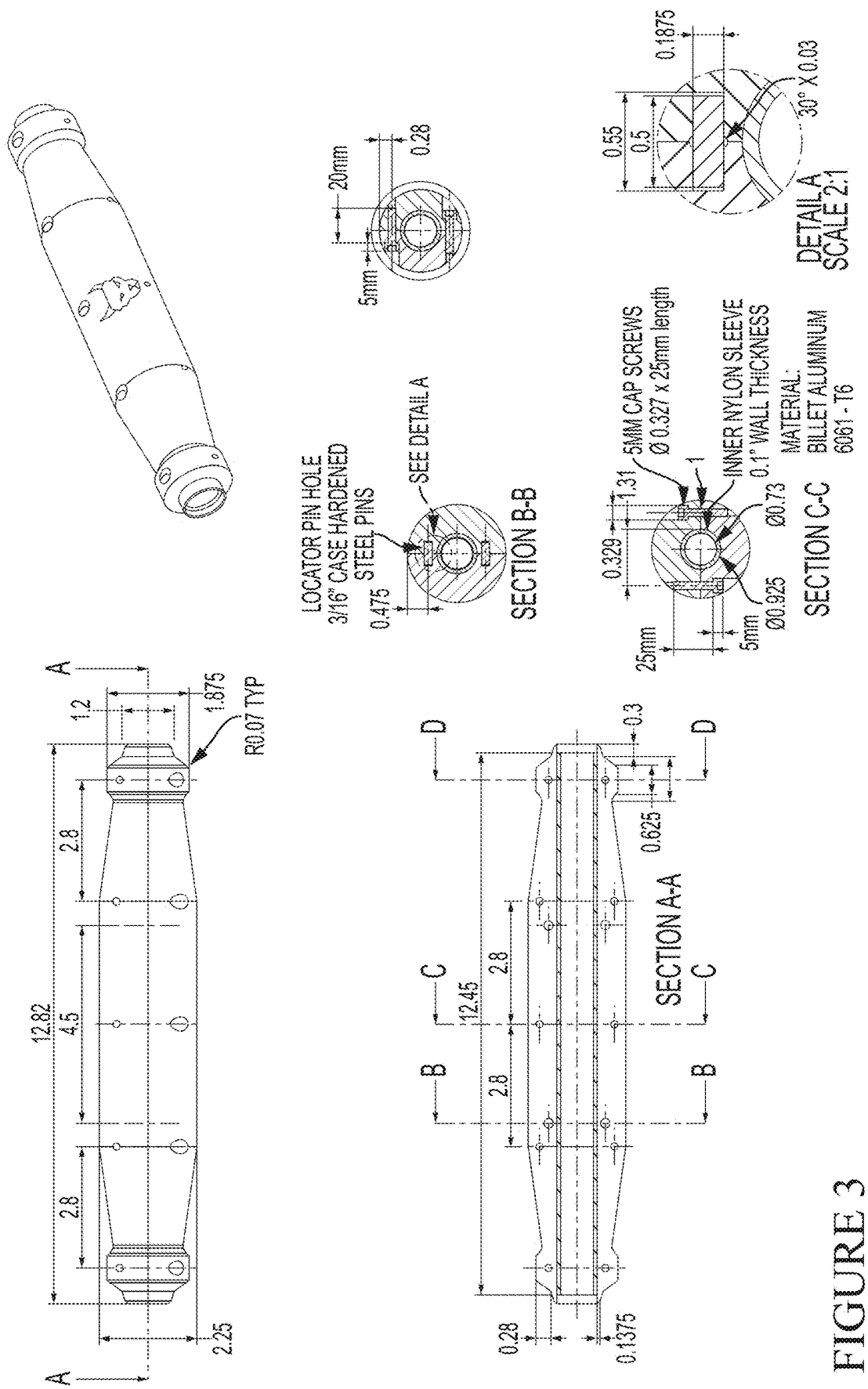
FIG. 3 shows detailed elevation views of first embodiment of present invention.

Element 5 of FIG. 2 shows an axle shaft.

Figure 4:
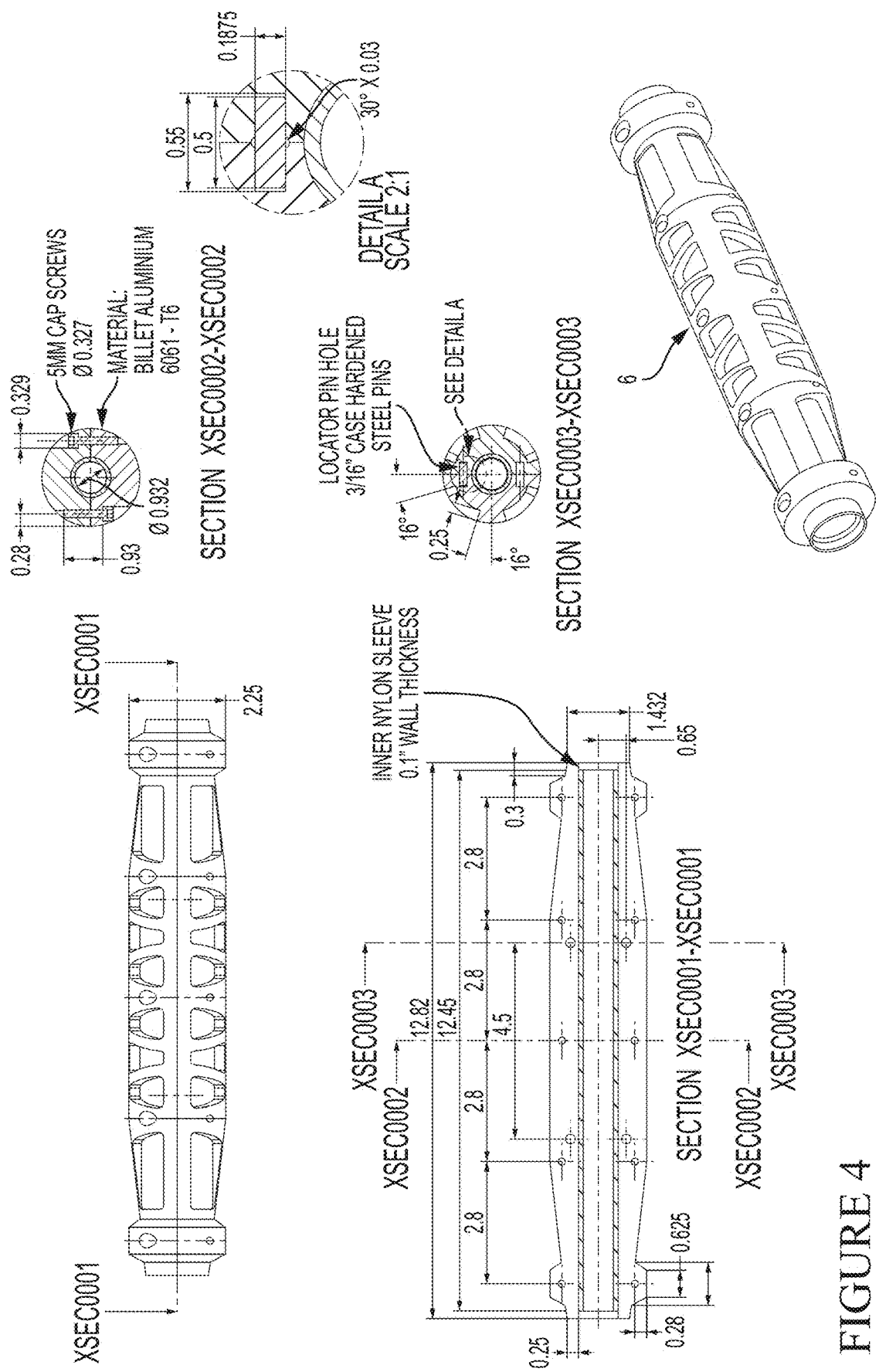
FIG. 4 shows detailed elevation views of first embodiment with optional cored out material for weight reduction.

Element 6 of FIG. 4 shows an optional cored out material for weight reduction.

FIGS. 1-2 illustrate the preferred embodiment of the present invention. The sleeve 1 is a tubular component that may be extruded or machined from solid stock, is not limited to, but in its preferred embodiment, is manufactured out of a polymeric material such as nylon, with a slit down its length so that it can be spread and snapped onto an axle shaft 5 that includes a longitudinal axis 10 and an outer surface 12. After the sleeve 1 is snapped over the axle shaft 5 the two axle guard halves 2 are clamped around the sleeve using the dowels 4 for alignment and the socket head cap screws 3 to clamp the axle guard halves onto the sleeve. The axle guard halves may be cast, extruded, molded, or as in the present invention, machined out of, but not limited to, billet aluminum. The fit between the axle guard halves and the sleeve as designed is an interference fit which is to say that the inner diameter of the axle guard halves is smaller than the outer diameter of the sleeve, and when clamped together this allows for positive and direct transfer of energy from the axle, into the sleeve, and subsequently the energy is absorbed and dissipated into the axle guard halves. In its preferred embodiment, the sleeve is a material with a low friction coefficient allowing the axle to operate as the original manufacturer intended. That is to say, the designed-in torsional flex characteristics of the axle is still allowed to occur because the axle can still twist. By absorbing and dissipating energy, the present invention, protects the drive-train of the vehicle by giving the energy a place to travel to other than the drive-train consisting of, but not limited to, axles, joints, and differentials. The present invention when assembled to the axle prevents the axle from bending. Axle bending is another failure mode that causes axle failure from repeated bending causing material fatigue or a single significant bend causing immediate axle breakage.

FIG. 4 illustrates a version of the present invention where material is cored 6 out of the axle guard halves as a means to reduce weight. These cored out features could be created by, but not limited to, machining, casting, and molding.

Figure 5:
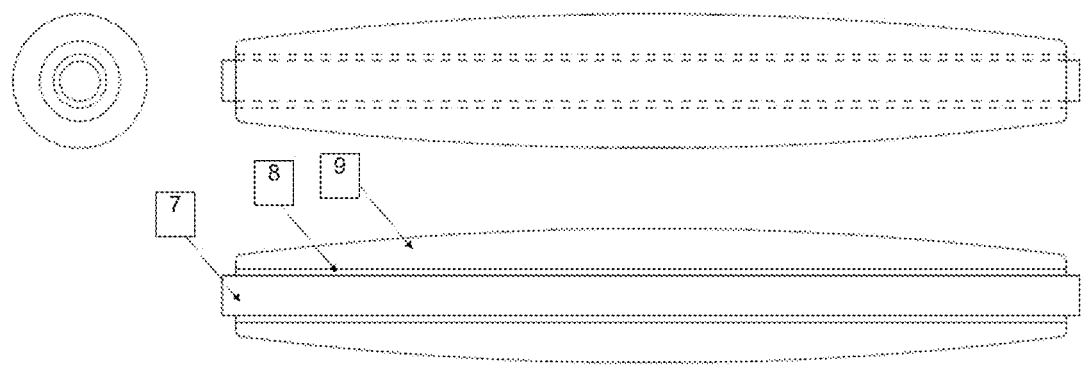
FIG. 5 shows elevation views of alternative embodiment showing one piece version as opposed to two axle guard halves 2 referenced in FIG. 1.

FIG. 5 illustrates an alternative embodiment of the present invention where a single piece axle guard replaces the two axle guard halves 2. The sleeve 1, 7 is a tubular component that may be extruded or machined from solid stock, is not limited to, but in its preferred embodiment, is manufactured out of a polymeric material like Nylon, with a slit down its length so that it can be spread and snapped onto an axle shaft. After the sleeve 8 is snapped over an axle 7 the single axle guard 9 is slid over the sleeve using an arbor press or equivalent assembly machine to press the axle guard over the sleeve in an interference condition as described in the first embodiment of the present invention. The axle guard can be cast, extruded, molded, or as in the present invention, machined out of, but not limited to, billet aluminum. An alternative method is injection molding the guard out of a polymer in an over-molding process that will mold the net shape guard over the sleeve eliminating the need to assemble the guard over the sleeve.

The invention claimed is:

1. An axle assembly, comprising:
an axle shaft including a longitudinal axis and a shaft outer surface;
a polymeric tubular sleeve surrounding and in contact with a majority of the shaft outer surface of the axle shaft and configured to permit the axle shaft to rotate about the longitudinal axis within the sleeve, the sleeve having a sleeve outer surface; and
an axle guard surrounding and in contact with a majority of the sleeve outer surface of the sleeve.

2. The axle assembly of claim 1, wherein the sleeve further comprises a slit configured to facilitate removable positioning of the sleeve surrounding and in contact with the majority of the shaft outer surface of the axle shaft.

3. The axle assembly of claim 2, wherein the slit extends along an entire longitudinal length of the sleeve.

4. The axle assembly of claim 1, wherein the sleeve outer surface has a first diameter and the axle guard further comprises an axle guard inner surface configured to mate with the sleeve outer surface, the axle guard inner surface having a second diameter that is smaller than the first diameter of the sleeve outer surface to form an interference fit.

5. The axle assembly of claim 1, wherein the axle guard comprises complementary axle guard segments configured to mate with one another and surrounding and in contact with the majority of the sleeve outer surface of the sleeve.

6. The axle assembly of claim 5, further comprising one or more alignment dowels configured to align the axle guard segments for mating.

7. The axle assembly of claim 6, wherein the axle guard segments each include a guard outer surface that includes a plurality of cavities to reduce weight in the axle guard.

8. The axle assembly of claim 1, wherein the axle guard is machined out of billet aluminum.

9. The axle assembly of claim 1, wherein the axle guard is made of a polymer.

10. The axle assembly of claim 9, wherein the sleeve and the axle guard are both made of polymer, with the axle guard being over-molded over the sleeve.

11. The axle assembly of claim 1, wherein the axle shaft further includes a main body portion and first and second opposed ends, and wherein an outer diameter of the main body portion is less than an outer diameter of the first end and than an outer diameter of the second end.

* * * * *